United States Patent [19]

Tollefsrud

[11] 3,967,910
[45] July 6, 1976

[54] ELEMENTS FOR INTERCONNECTION OF ENDS OF PROFILES AT CORNERS IN FRAMES, PANEL POINTS AND THE LIKE

[76] Inventor: Ole Jachob Tollefsrud, 2840 Reinsvoll, Norway

[22] Filed: Jan. 22, 1975

[21] Appl. No.: 543,075

[30] Foreign Application Priority Data
 Jan. 29, 1974  Norway................................. 268/74

[52] U.S. Cl............................... 403/402; 403/295
[51] Int. Cl.[2].......................................... F16D 7/04
[58] Field of Search .......... 403/402, 401, 292, 295, 403/174, 178; 52/758 H, 753 D, 656

[56] References Cited
UNITED STATES PATENTS

| 2,188,209 | 1/1940 | Sharp | 403/401 |
| 3,627,359 | 12/1971 | Paul | 52/656 |
| 3,782,054 | 1/1974 | Goss, Jr. | 403/295 |
| 3,848,390 | 11/1974 | Anderson et al. | 403/401 |

FOREIGN PATENTS OR APPLICATIONS

| 785,477 | 10/1957 | United Kingdom | 403/295 |

Primary Examiner—Andrew V. Kundrat
Attorney, Agent, or Firm—Brumbaugh, Graves, Donohue & Raymond

[57] ABSTRACT

The invention relates to an element having expandable legs for interconnecting the mitred ends of frame sections. The legs of the connecting element are expanded equally by a single forcing means, such as a screw, the axis of which coincides with a line representing the interface between the mitred ends of the frame sections.

5 Claims, 6 Drawing Figures

ELEMENTS FOR INTERCONNECTION OF ENDS OF PROFILES AT CORNERS IN FRAMES, PANEL POINTS AND THE LIKE

The present invention relates to an element for interconnecting the mitred ends of frame sections at corners in frames, panel points and the like. Connecting elements are known which comprise right angled elements having legs adapted to be inserted into adjacent ends of frame sections and secured in the respective frame sections by expansion. In order to procure such expansion each leg of the element is split into parallel parts which are forced apart by means inserted between them, such as screws, wedge pieces, or the like.

Connecting elements are known which comprise right angled elements having legs adapted to be inserted into adjacent ends of frame sections and secured in the respective [ends] frame sections by expansion. In order to procure such expansion each leg of the element is split into parallel parts which are forced apart by means inserted between them, such as screws, wedge pieces, or the like.

However, a disadvantage of expanding the legs of the connecting element in this manner subsists in having to perform the expansion operation separately for each leg of the element. This complicates the task of assembling the frame, does not insure equal expansion of both legs and, further, requires the use of more parts. In addition, it is necessary to provide each leg of the element with at least one screw hole, and corresponding insertion holes for the screws must be formed in the walls of the frame sections to be interconnected, thereby marring the outward appearance of the assembly.

The present invention relates to an element for interconnecting the mitred ends of frame sections at corners in frames, panel points and the like, which eliminates the above-mentioned drawbacks. According to the invention both or all legs of a connecting element are expanded at the same time and to an equal extent by means of a single forcing organ, such as a screw, which is operated through a hole having its axis coinciding with the line representing the interface between the ends of the frame sections, and being placed at the outer or inner apex of the frame corner, where it is inobtrusive.

The element according to the present invention for interconnecting the mitred ends of frame sections at corners in frames, panel points and the like, comprises at least two legs arranged at right angles to each other having in common an outer and an inner angle wall defining an intermediate space separating the angle walls and inclined end walls connecting the corresponding ends of the angle walls in each leg. The outer and inner angle walls form an outer and an inner apex point, respectively, at the corner angle of the legs, which apex points are separated by the intermediate space between the angle walls. The connection element further comprises means for forcing the apex points of the angle walls apart relative to each other in order to impart a displacement of the angle walls relative to each other which, in cooperation with the inclined end walls, causes contemporary and equal expansion of both legs, resulting in a secure grip of each leg in the corresponding frame section, thus fastening the frame sections together.

In this manner the invention provides a sidewise open element which in a simple and easy manner may be produced, mounted and exanded in the parts to be connected to each other. The shape of the element render possible that it may be produced with small thickness for use in connection with frame sections having flat form, and for that purpose it may be stamped from suitable metal plate. Further it is possible to extrude a profile, having a cross-section equal to that of the element, and cut said profile in sections corresponding to the thickness of desired elements.

Some embodiments of the invention are, only as examples, closer described in the following specifications with reference to the accompanying drawing in which.

Figure 2:
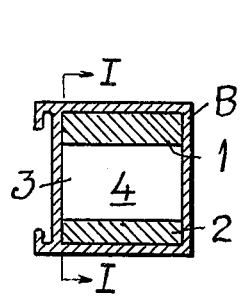
FIG. 2, shows a cross-section along the line II—II in FIG. 1.
Figure 1:
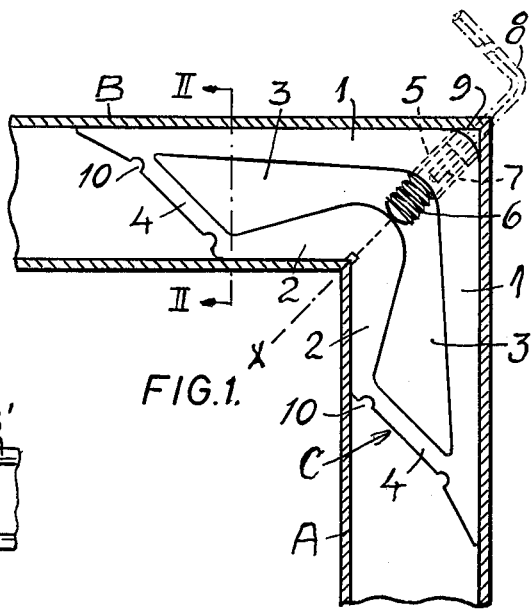
FIG. 1 is a sectional side view, along the line I—I in FIG. 2, of a frame corner interconnected by an angle element according to the present invention.

Referring to FIGS. 1 and 2, the ends of two closed frame sections, denoted A and B respectively, are shaped to be interconnected in right angle by means of a connection element, generally denoted C.

The element C comprises two in right angle with each other arranged legs, adapted to be slideably insertable in the ends of the respective ends of the frame sections A,B, and is formed by outer and inner angle walls 1 and 2 respectively, separated by an intermediate space 3, and connected at the ends of each leg by end walls 4, inclined outwardly from the ends of the inner angle wall 2, substantially at right angle to the median line X of the corner angle, as shown.

In the median line X the outer angle wall 1 is provided with a threaded hole 5 for a setscrew 6 with an end bore 7 for a wrench 8 insertable through a hole 9 at the adjacent outer edges of the frame sections A,B for operating said screw 6. It will be understood, that the screw 6 may be placed in a similar manner in the inner angle wall 2.

As above stated the legs of the element are adapted to be slideably inserted in the respective ends of the frame sections A,B to the position shown in FIG. 1. In driving the apex of the angle wall 1 away from the angle wall 2 by means of the screw 6, the wall 1 during this movement undergoes in both legs a minor longitudinal displacement relative to the wall 2, and thereby the end walls 4 are swung to a somewhat steeper position so that both of the legs of the element are expanded at the same time and to an equal extent for a safe fastening thereof in the ends of the frame sections A,B.

Due to that the angle legs of the outer wall 1 during expansion also obtain a minor outwardly displacement ensures that the ends of the frame sections are drawn in close contact with each other.

In order to provide necessary clearance for the expanding of the element in the profiles, the angle between the outer surfaces of the angle wall, which is to be forced outwardly, may be reduced with about one degree with respect to the angle between the adjacent inner surfaces of the frame section ends, and with this arrangement is secured that the frame sections are not forced away from each other.

The expanding action of the inclined end walls 4 of the legs may be adjusted by alteration of the slanting thereof. Further the cross-section of the end walls 4 adjacent the angle walls 1, 2 may be reduced by grooves 10 in order to lighten the movement of said walls 4.

Figure 3:
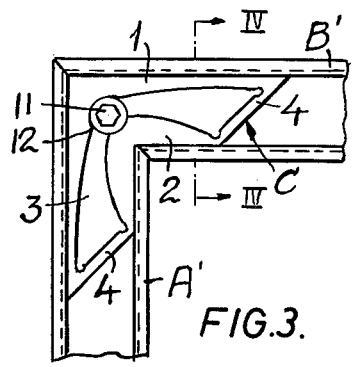
FIG. 3 is a side view of an angle element interconnecting adjacent corner ends of flat frame sections.
Figure 4:
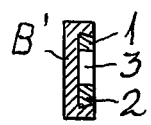
FIG. 4 is a cross-section along the line IV—IV in FIG. 3.

In FIG. 3 and 4 an embodiment is shown in which two frame sections A' and B' with small thickness and channel shaped cross-section, forming a corner, and are interconnected by means of a connecting element C' substantially similar to and operating in the same manner as that shown in FIG. 1.

As forcing means for the expansion of the legs of the element there is between the angle walls 1, 2, in the narrowest part of the intermediate space 3, rotatably supported an oval pin 12, with a wrench opening 11, and by rotation of said pin 12, the corner portions of the angle walls 1, 2 may be moved away from each other and thereby expand the legs of the element in the previously described manner for safe interconnection of the adjacent frame section ends.

Figure 5:
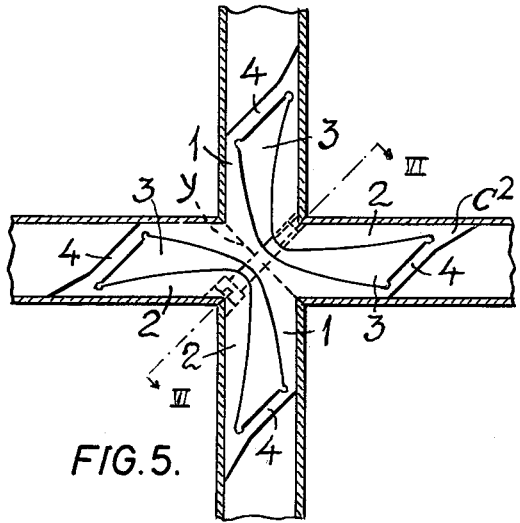
FIG. 5 shows a sectional side view, similar to FIG. 1, of an angle element according to the invention adapted to interconnect the ends of four adjacent frame sections.
Figure 6:
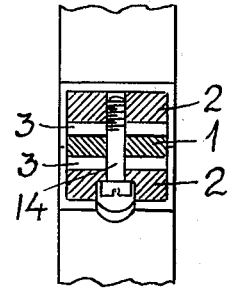
FIG. 6, is a cross-section along the line VI—VI in FIG. 5.

In FIG. 5 and 6 is illustrated an altered embodiment of the invention in which the element is formed for interconnection of the ends of four profiles with intermediate right angles.

The elements generally denoted $C^2$ is in this embodiment cross-shaped and adjacent legs thereof are in pairs formed in the same manner as described in connection with FIG. 1. The element $C^2$ may therefore be characterized as consisting of two in one piece formed elements C the angle walls 1 of which are united along a line at right angle to the median line X as shown in the dotted line Y in FIG. 5.

As forcing organ for expansion of the legs of the element a clamping screw 14 is passed through the same parallel to the median axis X in such a manner that the angle walls 2 may be screwed towards each other and thereby enforce the above described longitudinal displacement thereof relatively to the cooperating angle walls 2 and end walls 4 for contemporary and equal expansion of all four legs and a safe fastening thereof in the respective frame section ends. As in this case the angle walls 2 are displaced longitudinally the respective end walls 4 must form an acute angle therewith, substantially parallel with the median axis X as illustrated.

I claim:

1. An unitary element for interconnecting the ends of frame sections at corners in frames, panel points and the like, comprising at least two legs arranged at right angles to each other, each having in common an inner and an outer angle wall said angle walls being opposed to each other and defining an intermediate space therebetween and inclined end walls connected to the corresponding ends of the angle walls in each leg, the inner and outer angle walls forming inner and outer adjacent apex points, respectively, at a corner angle of the legs, said element further comprising means for forcing the apex points of the angle walls apart so as to impart in each leg a dislacement of the angle walls relative to each other which, in cooperation with the inclined end walls of the legs, causes contemporary and substantially equal expansion force to be applied so as to expand both legs in the ends of the respective frame sections to fasten the frame sections together.

2. The element according to claim 1, wherein said forcing means is a screw threaded through the apex of one of the angle walls and adapted to force the apexes of both of the angle walls away from each other.

3. The element according to claim 1, wherein the outer angle wall is the angle wall bordering the exterior of the angle defined by the legs, and wherein the inclined end wall in each leg forms an acute angle with the end of the corresponding outer angle wall.

4. An unitary element for interconnecting the ends of frame sections at corners in frames, panel points and the like, comprising four legs arranged in a cross configuration, one pair of adjacent legs at an angle to each other and each having in common an inner and an outer angle wall said angle walls being opposed to each other and defining an intermediate space therebetween and inclined end walls connected to the corresponding ends of the angle walls in each leg, the inner angle wall which borders the interior space of the angle defined by the pair of legs forming an inner apex point, and the other pair of adjacent legs having the same arrangement of inner, outer, and inclined end walls as the one pair, the arrangements of both pairs being joined back-to-back along a common axis of their respective outer walls to form the cross configuration, said element further comprising means for drawing the inner apex points of the respective arrangements toward each other so as to impart in each of the four legs a displacement of the walls relative to each other which, in cooperation with the inclined end walls of the respective legs, causes contemporary and substantially equal force to be applied so as to expand the legs in the ends of the respective frame sections to fasten the frame sections together.

5. The element according to claim 4, wherein the inclined end walls of the respective legs form acute angles with the ends of the corresponding inner angle walls.

* * * * *

UNITED STATES PATENT AND TRADEMARK OFFICE
CERTIFICATE OF CORRECTION

PATENT NO. : 3,967,910
DATED : July 6, 1976
INVENTOR(S) : Ole Jachob Tollefsrud

It is certified that error appears in the above-identified patent and that said Letters Patent are hereby corrected as shown below:

Column 1, lines 16-23, delete "Connecting elements.... like." (second occurrence);
Column 1, line 13, "into" should read --in--;
Column 2, line 2, "exanded" should read --expanded--;
Column 4, line 10, "dislacement" should read --displacement--.

Signed and Sealed this

Twenty-eighth Day of December 1976

[SEAL]

Attest:

RUTH C. MASON
Attesting Officer

C. MARSHALL DANN
Commissioner of Patents and Trademarks